Patented May 2, 1933

1,907,088

UNITED STATES PATENT OFFICE

EMIL E. NOVOTNY, OF PHILADELPHIA, PENNSYLVANIA, ASSIGNOR TO JOHN STOGDELL STOKES, OF SPRING VALLEY FARMS, HUNTINGDON VALLEY P. O., PENNSYLVANIA

ABRASIVE BODY AND METHOD OF MAKING THE SAME

No Drawing. Original application filed September 6, 1930, Serial No. 480,281. Divided and this application filed November 26, 1932. Serial No. 644,552.

This invention relates to thermosetting resinous products and the method of making the same, utilizing as an ingredient various natural resins of plant origin containing phenolic tannols. Among resins of this class I may mention red and yellow gum accroides, gum benzoin and dragon's blood. My product comprises the admixture of various phenolic bodies or phenolic derivatives, preferably through preliminary reaction, in order to improve these natural resinous bodies to increase their preliminary fusibility, solubility, etc., and ultimately their strength, speed of cure, and ultimate complete infusibility.

This application is a division of my application to Thermosetting resinous products and method of making the same, Serial No. 480,281, filed September 6, 1930.

These natural resins usually contain, when purchased in bulk, from 5 to 15% of more or less objectionable foreign matter such as sand and other gritty products which are extremely difficult to remove without altering the desirable properties of these resinous bodies. For most uses I find it highly desirable to eliminate this foreign matter, and I find it quite simple to do so inasmuch as the phenolic bodies such as phenol, cresol, xylenol, etc. are good solvents for these natural gums and while in solution the gritty foreign matter may be removed as by settling, precipitation, centrifuging or filtration. While these gums are preferably but not necessarily in solution I may add suitable proportions of an aldehyde and/or an aldehyde derivative to combine with the phenol and natural gum to produce a potentially reactive resinous varnish, balsam, gum, or solid, hard, grindable resin.

These natural gums are reactive with and soluble in relatively water free aldehydes such as furfural, benzaldehyde, acetaldehyde, butyl aldehyde, etc., and the thermo-reactivity of these resins is greatly increased while in the presence of these solvent aldehydic bodies. Impurities may readily be removed while these gums are in solution, either while in a cold or warm state. The proportion of aldehyde added is not material inasmuch as any excess aldehyde may readily be caused to combine with any phenolic bodies which are preferably again added and a reaction caused to ensue to produce a product of liquid, semi-liquid, balsamlike or solid resinous nature.

The product is, furthermore, soluble and compatible with various aldehyde derivatives or polymers of aldehydes such as paraldehyde, furfuramid, furfur alcohol, trioxymethylene and hexamethylenetetramine. Of course, the dry aldehyde derivatives being solid bodies do not permit of removal of extraneous bodies as do the liquid bodies previously mentioned.

There is at this date considerable literature on these natural resins, such as British Patent No. 225,944, of December 15, 1924, to the British Thomson-Houston Co. Ltd., wherein it is disclosed— "———— that natural aromatic resins, as for example, acroides gum and benzoin gum, can be rendered infusible or non-fusible by heating in the presence of formaldehyde. Molded compositions embodying my invention may be made by mixing with the aromatic gum, a compound or derivative of formaldehyde, such for example, as hexamethylene-tetramine." Similarly, the "Chemistry of Natural and Synthetic Resins," by Barry, Drummond & Morrell, published by D. Van Nostrand Co. 1926, wherein a discussion appears as to the analysis and properties of gum accroides on pages 87 and 88. Also Rennie, Cook & Findlayson (translation Chem. Soc., 1920, 117, 338).

The addition of 10% of hexamethylenetetramine to the accroides gum, as taught in the British Patent No. 225,944 previously mentioned, was followed by me under carefully controlled conditions. The hexamethylenetetramine was thoroughly ball-milled with the gum to provide as thorough a blend as possible and then mixed with, in parts by weight, wood flour 115, black dye 3, calcium stearate ½, to 100 parts of the gum-hexamethylenetetramine mixture. The mass was rolled on differential rolls, the hot roll heated to 310° F. and the cool roll heated to 210° F., and the rolling continued for a period of 1½ minutes. This composition produced a moldable plastic material which would cure to incomplete but ultimate infusibility without blistering when pulled hot from the die after a cure of 12 minutes and showed a flow of 3%. The product was so full of abrasive material as to be unusable in polished steel dies as the metallic faces of such dies would be badly scratched through these abrasive bodies which the gum originally contained.

A cure of 12 minutes is altogether too slow as it is essential that a good molding compound give a complete cure in at least 3 minutes. The product, furthermore, was incapable of going to complete infusibility regardless of the length of time cured, and left a sticky, tacky substance on the surface of the molded part.

The flow of 3% is insufficient for ordinary molding practice as it is necessary to have a relative flow of about 12% to provide a plastic mass capable of being molded under the usual pressures which are safe for polished, case hardened steel dies. By adding to these natural gums a quantity of phenol, which may be done in any suitable mixing device or which may be worked in on the differential rolls as previously described, the reactivity of this product is increased very materially. For example, by the addition of only 10 parts of the weight of the resin in a phenolic body such as U. S. P. phenol crystals and without increasing the quantity of hexamethylenetetramine called for, I am enabled to decrease the cure from 12 to 4 minutes and increase the flow from 3 to 9%. By increasing the proportion of phenol somewhat and, if necessary, increasing the proportion of hexamethylenetetramine I am enabled to further increase the flow and reactivity of the product.

I am likewise enabled to increase the curing time of these natural resins and improve the final infusible products so far as ultimate infusibility and strength are concerned through the addition of a quantity of potentially reactive synthetic resin which may be either of the single stage or which may have a hardening agent such as hexamethylenetetramine added thereto. The addition of at least an equal weight of such synthetic resin to such finely ground natural resin will provide an alloy having greatly improved flow in addition to becoming more reactive. The strength, likewise, of the product is increased to practically the same strength as products made of synthetic resins throughout. In other words, a molding compound made of gum accroides and hexamethylenetetramine in admixture with the fillers previously mentioned will show a tensile strength of only 3200 pounds to the square inch whereas a blend of synthetic resin and the gum accroides resin on the basis of equal parts by weight will show a tensile strength of approximately 5000 pounds to the square inch, or practically the same strength as the usual compounds now in use.

Of course, the impurities present in the gum accroides product would make it out of the question to use such product in any molding composition formed in highly polished molds or as is usually the case and, therefore, it is of utmost importance to either eliminate the abrasive tendency of these impurities or eliminate the impurities themselves.

I have found that by pulverizing the gum accroides resin and passing the pulverized product through a 200 mesh sieve, practically nothing but the gritty and woody substances will remain on top of the sieve to be discarded. Any pulverized, gritty materials have been reduced to a fine powder and these, when admixed with fillers, other resins, etc., have little or no abrasive effect on the steel dies.

Preferably, however, I dissolve these natural gums such as the gum accroides in a reactive solvent such as phenol or a phenolic body, and I may add to such solution an aldehyde capable of combining therewith, such as, for example, furfural, which further tends to lower the viscosity of the solution. I am then enabled to thoroughly strain or purify the solution, ridding the mass of all insoluble bodies. Thereupon I cause a reaction to ensue within the mass either by use of elevated temperatures or the use of suitable bases, acids, salts or other catalysts to produce a resinous body of such solution of natural gum and reactive liquid synthetic resin forming ingredients. In the case of furfural, for example, the product is preferably heated in a jacketed still provided with a condenser for refluxing and for distillation, and preferably I add from ½ to 2% of the weight of the phenol used in a basic catalyst such as potassium, sodium or calcium carbonate. The product is refluxed for a period of one hour and then allowed to distill with the temperature rising to approximately 270° F.; and if a solid, grindable resin is required, and, of course, depending upon the amount of phenol and furfural added to the natural resin, the temperature may be allowed to reach 330° F. The product may now be removed from the digester into suitable cooling pans or may be cut with a suitable solvent such as an alcohol if a varnish is desired. To the solid resin, usually in a grinding operation, an extra accelerating agent is added, such as some form of aldehyde or aldehyde derivative such as furfural, furfur alcohol, furfuramid, formaldehyde, trioxymethylene or hexamethylenetetramine. In the case of dry resins, it is preferable to use either trioxymethylene or hexamethylenetetramine as the hardening agent, and this may be used in from 2 to 15% of the resin weight.

In reacting a mass of this type, using furfural as an aldehyde, it is to be understood that other aldehydes and other suitable catalysts could be added, as for example, formaldehyde, to produce a product of either a one or two stage resin. The formaldehyde reaction being more energetic, lower temperatures may be used. This resinous product is either slowly reactive at elevated temperatures or else rapidly reactive, depending upon whether or not additional accelerating agents such as hexamethylenetetramine are added thereto.

Where a slowly reactive product is to be made, the addition of a water free reactive aldehyde or aldehyde derivative such as furfural, furfur alcohol, etc. is very desirable inasmuch as the product is both a solvent and a hardening agent for these natural gums. It is then also possible to remove with greater ease insoluble impurities, etc. if this should be thought advantageous.

Although it is possible to admix the resin forming reagents with these natural gums, with or without additional hardening or accelerating agents, and, furthermore, although it is advantageous to add previously made synthetic resins of various types to these gum accroides products, it is to be understood that the highest reactivity and strength are obtained when such resin forming reagents are caused to react in the presence of these natural gums as in a suitable digester used by the makers of synthetic resins. As for example, a reaction in the presence of gum accroides, phenol, furfural and potassium carbonate in such proportions as to yield approximately twice the weight of resinous reaction product of the weight of gum accroides originally used will provide a synthetic resin curing in less than 3 minutes and having a flow as high as 40%. In other words, instead of using only 115 parts of wood flour to 100 parts of resin, it is possible to use with this mixture fully 200 parts of wood flour. I have found it preferable to add to the 100 parts of this resin approximately 8.1 parts of hexamethylenetetramine as under these conditions optimum-molding speed, cure and strength are obtained.

Wherein I have stated that I may use various aldehydes as solvents for these natural gums, it is to be understood that these aldehydes can be used in excess of that ordinarily required to combine with such gum and that I may subsequently add a product such as urea or thiourea for the purpose of combining with such excess aldehyde such as, for example, the furfural or formaldehyde used, in order to produce an inexpensive, strong, tough material having practically no phenol and aldehyde odor. The natural gum itself has no phenol odor and is really a sweet and pleasant smelling product when heated at high temperatures. If no phenol has been added, the difficulty of removing free phenol as where a tasteless, odorless synthetic resin is to be produced is eliminated. On the other hand, it is to be understood that for some purposes, it is advantageous to add both a phenol with an aldehyde in excess, in which case the inodorous aldehyde combining products such as the urea or thiourea can be combined subsequently.

For laminated work where varnishes are generally used it is essential that these natural gums be quite free from impurities and at the same time yield strong, tough products, and for certain purposes should have high plasticity, punchability, dielectric strength, and exhibit ease of punching when cold. For this purpose it is not always advisable to utilize a high percentage of phenol and, therefore, I prefer to proceed along somewhat different lines as, for example, I dissolve these natural gums in only sufficient phenolic bodies such as the cresols and/or xylenols to permit the filtration or removal of the impurities and to permit the ready admixture of such dissolved gum with a suitable aldehyde such as formaldehyde which is added in a sufficient quantity to act both as a combining agent with the phenolic body used and with the natural gum to be acted thereon. The product is refluxed for one to two hours with constant stirring, when it will be found that the formaldehyde is thoroughly combined with both the phenolic body and the natural resinous body and that a reaction has occurred between these ingredients, depending, of course, to some extent upon the type of catalyst used. So soon as the reaction is completed the excess water is distilled and a suitable solvent such as an ethyl or methyl alcohol is added thereto to provide a varnish having the proper body. I have found for my purpose that it is best to provide a varnish for impregnation purposes utilizing these natural resins in combination with synthetic resins having a viscosity of not less than 10 and not over 500 Störmer at 77° F. with the resin solvent at 52% in solution in #5 completely denatured alcohol. Under these conditions of viscosity it is possible to secure impregnation and at the same time maintain a surface coating upon the sheet.

In actual practice it will be found that the most desirable viscosity at this temperature and per cent solids is between 40 and 90 Störmer.

By this method I am enabled to produce a relatively clean, resinous product of increased solubility and reactivity, and convertible more completely when further heated either alone but preferably in the presence of hardening and accelerating agents to a final, hard, set and infusible form. The product provides clean films and is, therefore, useful as a coating and impregnating varnish.

The resin is compatible with cellulose esters such as nitrocellulose and cellulose acetate and is, therefore, useful as a modifying resinoid or balsam for these products, greatly increasing the film strength, reducing the penetration of ultraviolet rays, improving the weathering qualities or, in short, not only providing a greater solids content for the lacquers but at the same time greatly improving the flexibility, weathering resistance, etc., of such films.

In molding compositions I am enabled to produce either balsamlike bodies or solid, grindable, resinous products which may be mixed with suitable filling material of either an organic or inorganic nature and, for ordinary uses, preferably of a non-abrasive nature such as wood flour, talc, mica, asbestos, etc., but for special abrasive uses may be mixed with various natural or artificial abrasives such as are now used in the production of abrasive bodies such as wheels, discs, segments, sharpening stones, etc.

By my method I am also enabled to provide a product which is more soluble in dilute alkalis, which may more readily be precipitated therefrom and which may therefore be conveniently incorporated as at the beaters or stuff chest of a paper mill with various fibrous bodies to be incorporated therewith into paperlike sheets of any desired thickness. These sheets may subsequently be pressed and molded to any desired shape. I have found this product to be quite valuable in the manufacture of various shock resisting shapes such as laminated sheetlike bodies. This converted natural resin can be powdered to an extremely fine form and may in this condition be suspended in the beater or stuff chest liquors either with or without the use of a suspensoid such as, for example, starch or other gelatinous material. It is, however, to be understood that I reserve the right to use these natural gums either in the form of previously reacted bodies with aldehydes or in the presence of phenolic bodies including added supplementary accelerating or hardening agents if desired.

It is my purpose to utilize these natural thermosetting resins either as starting raw materials for the production of useful, strong and ultimately infusible bodies for use as impregnating varnishes in the manufacture of various laminated structures such as of cloth, paper, etc.; for use as balsams or modifying agents for various resinous and non-resinous plastics, lacquers and varnishes; as modifying agents for synthetic resins; as useful in the plastic molding art as various reaction and reactive products for hot or cold molding of mechanical and dielectric bodies and for the production of self lubricating bearings, carbon brushes, and various abrasive and non-abrasive compositions and shapes.

I may combine or incorporate various liquid, semi-liquid or solid bodies having desirable technical properties such as colors, pigment, dyes, modifying agents, plasticizing bodies, solvents, etc., either prior to, during the conversion or thereafter, providing resinous alloys or compounds most suitable for the many diverse uses made of my modified natural resins.

For example, I can combine or incorporate with my resins from 5% to 100% of rosin by heating the products to a temperature of from 150° F. to 350° F. to provide a useful gum for the varnish maker. I may substitute for the rosin ester gum or by the addition of glycerine may produce the ester gum in situ. Similarly, I may add from 5 to 100% of china wood oil of the weight of the gum accroides or the like and heat the mass in a suitable heated digester either in the presence of added phenolic bodies and/or aldehydes to provide a balsam, gum or resin useful for the lacquer and varnish maker.

For use in the making of hot or cold pressed abrasive wheels, I can coat the abrasive grain surfaces with a solvent such as furfural, or furfur alcohol and add thereto a pulverized gum accroides resin of either the natural form including a hardening agent or else in its modified form after having been combined with phenol or an aldehyde or both. The gum when cut with furfural, furfur alcohol or other solvents to make a product having a specific viscosity of from 150 to 500 Störmer at 77° F. provides a sticky, tacky body capable of holding a sufficient quantity of pulverized gum or synthetic resin including hardening agents, etc., to provide either a wet or dry granular mix moldable either in heated or cold molds.

These gums are compatible with urea and thiourea and will produce useful alloys when combined in the presence of a suitable quantity of an aldehyde such as formaldehyde or its polymers and derivatives.

Likewise, I can combine these gums in the presence of a trace of a mineral acid such as sulphuric with a polyhydric alcohol such as glycerine or else I can produce a desirable alloy by combining therewith a polybasic acid such as phthalic anhydride and a polyhydric alcohol such as glycerine.

These natural gums will combine with small quantities of carbohydrates when heated in the presence of traces of mineral acids such as sulphuric and when first cut or dissolved in phenol about 60% of the phenol weight in a carbohydrate in the presence of a trace of a mineral acid be combined to provide a modified resinous alloy having improved solubility and flow.

I have given previously general examples of the reactions most suitable for utilizing these natural resins through reactions with phenolic and aldehydic bodies, either in the presence or absence of catalysts, accelerators and/or hardening agents. A few examples are given to more clearly illustrate several methods that may be used as a basis for the production of new, valuable, potentially reactive resinous products.

Where I call for gum accroides I prefer to use the red gum accroides of commerce but can use other natural gums of plant origin containing free phenolic hydroxyl groups.

The reactions are preferably carried out in a closed copper lined digester provided with heating and cooling coils, a stirring device, a condenser for refluxing and distillation and necessary outlets and inlets. The digester is preferably heated with steam and cooled with water.

The quantities given are all parts by weight.

Example No. 1

Phenol, U. S. P _____ 50.
Furfural _____ 42.5
Gum accroides _____ 35.

Heat to dissolve gum and strain to remove impurities. Add to clear product

Potassium carbonate _____ 0.75

Reflux but preferably distill through separator. In 2¼ hours of distillation through separator an end temperature of 310° F. is reached and a hard, grindable resin having a melting point approximately 310° F. is produced.

By a separator I mean a device capable of removing the water as soon as condensed from the distillate and of returning the condensed phenol, furfural and other reagents to the digester. A separatory funnel can be used instead as the reagents will settle to the bottom and may be frequently returned to the kettle. In principle, the device is a concentrator of the reactive reagents contained in the distillate and by rejecting the water a high end temperature is attained without counter pressure. This high temperature is required when furfural and other high boiling aldehydes are used as furfural starts to react in the presence of phenols and gum accroides at 270° F. which is well over the boiling point of water.

This product is slowly reactive and when a solvent such as alcohol, furfural or furfur alcohol is added can be used for various varnishes for coating and impregnation as is well understood. The speed of cure of the product can be increased by the addition of about 5 parts, more or less, of hexamethylenetetramine to each 100 parts of the resin solids. The keeping qualities are poor when hexamethylenetetramine is added and it is therefore preferable to add this hardener when the varnish or lacquer is to be used; otherwise, the product will go to a rubbery mass in a month to six weeks at room temperatures.

This product also makes a strong, free flowing, hard resin for use in making various compounds when pulverized with 10% of the resin weight in hexamethylenetetramine. Speed of cure 3 minutes.

The speed of cure and strength can be further increased by adding to this mix 12% of the resin weight in a two stage phenol resin, preferably a phenol-formaldehyde product. Speed of cure 1½ minutes. It will be of interest to state that under similar conditions a two stage phenol-furfural or formaldehyde resin made in the regular well known manner will show a speed of cure of 3 minutes, and a gum accroides resin with 10% of hexamethylenetetramine added as described in British Patent No. 225,944 will show a speed of cure of 12 minutes.

For pulverizing I prefer to grind in a ball mill to a fineness of 200 mesh.

Example No. 2

By substituting for the U. S. P. phenol a crude product containing some higher boiling phenolic bodies such as Barrett's crude phenol No. 1, the cure is lengthened by about one minute. The crude phenol is cheaper and makes a resin useful for many molding operations. By using cresols or a mixture of cresols and xylenols a product of greater flexibility and flow is provided, most useful for coating and impregnating varnishes.

Example No. 3

A mixture of
Gum accroides _____ 30.
Phenol, U. S. P _____ 25.
Furfural _____ 20.
Dissolve gum, strain and add
Potassium carbonate _____ 0.375
React as in Example No. 1.
Melting point 234° F. Solubility good.
When ground with 10% of resin weight of hexamethylenetetramine a cure of 3 minutes is attained but the flow is only 1%. Shows the need for a higher proportion of synthetic phenolic resinoids to provide a product of good flow. A similar product but differing in these proportions as in Example 1 shows a flow of at least 50%.

Example No. 4

| | |
|---|---|
| Monsanto duty free cresol and xylenol | 24. |
| Furfural | 16. |
| Gum accroides | 16. |

Dissolve gum, strain and add

| | |
|---|---|
| Potassium carbonate | 0.36 |

React using separator as in Example No. 1, distilling through separator for approximately 1½ hours, producing a sticky, tacky, balsamlike condensation product. Allow temperature to rise as volume of distillate decreases. Cool down to 180° F. and add

| | |
|---|---|
| Formaldehyde | 10. |

Boil under reflux for about a half hour, then distill through condenser. Cut with a suitable solvent such as No. 5 completely denatured alcohol. This product has long keeping qualities, requires no addition of hexamethylenetetramine and has great plasticity and covering power. Valuable as a varnish for producing fine, strong, well laminated paper and cloth products. The balsamlike material coats abrasive grains thoroughly with a sticky, tacky product capable of suspending any desired amount of pulverized resin of any type.

Example No. 5

| | |
|---|---|
| A phenol, cresol or xylenol mixture | 150. |
| Gum accroides | 100. |

Dissolve, strain, filter or centrifuge. Add

| | |
|---|---|
| Formaldehyde | 100. |
| Aqueous ammonia | 2.25 |

Reflux about ½ to 1½ hours, cool and decant from watery layer or distill under reduced pressure to reduce water.

Add preferably while warm

| | |
|---|---|
| Alcohol | 225. |

Heat until all in solution.

Reflux to provide a product having preferably a specific viscosity of from 20 to 200 Störmer at 77° F.

By cooling without the addition of a solvent after distillation to remove occluded volatile materials a hard, grindable resin is provided. Both the varnish and resin are potentially reactive and ordinarily require no added hardening agents. Lubricants, plasticizers, etc., can be added in usual well known amounts.

Example No. 6

| | |
|---|---|
| Phenol (Barrett's crude No. 1) | 50. |
| Red gum accroides | 35. |

Heat, dissolve, filter, add

| | |
|---|---|
| Formaldehyde | 35. |
| Sulphuric acid, U. S. P. | 0.03 |

Reflux 2 hours. Distill until a hard, grindable resin having a melting point from 180° F. to 250° F. is obtained. Cool and grind in ball mill with 5 to 10% lime and 5 to 10% hexamethylenetetramine of the resin weight. Grind very fine. Where a varnish is desired add solvent to warm kettle contents, omit lime; preferably add hexamethylenetetramine when product is to be used.

A very soluble resin of high reactivity. Makes good varnishes, molding compounds and abrasive wheel bonds.

Example No. 7

| | |
|---|---|
| Phenol (Barret's crude No. 1) | 50. |
| Gum accroides, red or yellow | 35. |

Heat, dissolve, filter and add

| | |
|---|---|
| Formaldehyde | 35. |
| Phosphoric acid, U. S. P. | 2. |

Reflux for about 2¼ hours. Distill to a melting point as given in Example No. 6 which is to be followed. Produces a light permanent and light colored, clear, resinous product.

Example No. 8

| | |
|---|---|
| Phenol | 50. |
| Gum accroides | 50. |

Heat, dissolve, filter, cool and add

| | |
|---|---|
| Formaldehyde | 75. |
| Phosphoric acid | 1.5 |

Reflux 2½ hours, was in several changes of water, decant. Add

| | |
|---|---|
| Urea, dry | 5. |

Heat to 130° F., stir well, and combine with free formaldehyde.

Dissolve in alcohol to 51% resin solids.

An odorless, inexpensive varnish for impregnation into fillers or laminated cloth or paper. By omitting the solvent a dry, grindable, odorless resin is produced for compounding with various fillers as paper, cloth, wood flour, etc. A good bond for food containers, dental parts and abrasive wheels for dental use. Other phenolic bodies can be substituted for the phenol. Resorcinol produces a very fast curing product; xylenol a slow curing resinoid.

Example No. 9

Gum accroides ground and sieved to about 200 mesh, discarding the material remaining on seive, consisting of hard, gritty and woody fibrous material. This eliminates foreign matter apt to scratch the dies or appear in the molded or coated article as a defect.

| | |
|---|---|
| Of this ground and purified material | 100 |
| Hexamethylenetetramine | 5 to 10 |

Grind in ball mill or otherwise thoroughly coat and blend.

This product can be used as a resin binder for various molding compounds. Used in this way the objection to the impurities is greatly minimized. The flow is low and curing speed is about 12 minutes. The product is low priced and where low filler content is called for or where temperatures in excess of 350° F. are available a use can be found due to its low cost.

*Example No. 10*

Gum accroides purified as in Example No. 9 but without the added hexamethylenetetramine_____ 30.
A reactive synthetic resin_____ 100.

Grind and/or blend thoroughly.

Various synthetic resins can be used such as those of the phenol, urea or glyptal type, but I prefer to use a phenol aldehyde resin of the potentially reactive type. No added hexamethylenetetramine is required for the gum as the reactive resin, especially when of the phenol-formaldehyde type, will harden the gum to greater ultimate infusibility than if such gum is used alone with added hexamethylenetetramine. Flow better than either resin or gum alone. Cure time fairly rapid.

A varnish can be made therefrom through the use of solvents.

*Example No. 11*

Gum accroides of Example 9 including hexamethylenetetramine_____ 100.
Reactive phenol-formaldehyde resin__ 12.5

Grind and/or blend. Greatly improved cure, flow and solubility.

*Example No. 12*

Gum accroides, commercial_____ 100.
Alcohol No. 5_____ 100.

Dissolve, remove impurities in any desired manner. Add ½% of gum weight to hexamethylenetetramine and reflux in digester for 2 hours or until a specific viscosity at 55% gum solids at 77° F. is 40 to 90 Stormer. Add 5 to 10% of gum in further hexamethylenetetramine when ready to use.

When the added alcohol is distilled from the mass as under reduced atmospheric pressure a solid, clean, grindable resin results with the hardening agent substantially combined therewith and useful for incorporation at the beaters or stuff chest of a paper mill into fibrous bodies and, if desired, in sheetlike form.

Additions of other synthetic resins, plasticizers, colors, fillers can be made at any time. Useful for laminated work when blended with other synthetic resinous varnishes.

The addition of alkalis such as oxides and hydroxides, whether dry or in aqueous solution, has a marked tendency to increase the reactivity of these natural resins and, therefore the addition of such bodies in small amounts may at times be desirable.

The addition of say 5% of the resin weight in calcium oxide is quite beneficial.

These natural resins, furthermore, are compatible with and soluble in urea and produce complex resinous condensation products when combined with a sufficient amount of formaldehyde to provide a product having little or no free urea. The reaction is advantageous inasmuch as the usual urea-formaldehyde resins such as are already well known in the art have no prolonged state of thermo-plasticity but follow rapidly from a liquid stage to a rubbery or solid stage. When, however, combined with purified resins of the gum accroides type the products become very plastic and therefore may be molded with ease. The manner of reacting these products does not matter so much so long as the reaction is carried on in accordance with prior art pertaining to the well known practice of combining formaldehyde and urea. The proportion of gum accroides used may be very small indeed, as I have found that only 5% of gum accroides thoroughly dispersed in the urea-formaldehyde condensation product would give a material having desirable flow. It is not well to use a high percentage because of the dark color of the accroides gum, but, of course, this is not objectionable if dark colored products are to be produced. Whether the reaction is carried in situ, i. e., in the presence of the gum accroides or not, is really immaterial as it is just as beneficial to incorporate this natural gum with a finely comminuted dry resinous condensation product or composition including fillers.

The statements with regard to the use of urea also apply to urea products containing sulphur, as, for instance, thiourea or mixtures of urea and thiourea.

Wherein I have used the term natural resin or gum or natural resin or gum of plant origin containing phenolic tannols or natural resin of plant origin containing free phenolic hydroxyl groups I mean to embrace such products as the several varieties of gum accroides, gum benzoin and dragon's blood of commerce.

Wherein I have claimed a phenolic body I mean to include various homologs or substituted phenols and various resinous condensation products derived from phenol. Among the phenols, for example, I would include among other homologs of phenol the cresols, xylenols, resorcinol, naphthols and mixtures of these.

Wherein I have described and claimed the use of furfural I mean to include any furane derivative which is useful for my purpose such as, for example, furfuramid or furfur alcohol or homologs of furfural such as, for example, ethyl or methyl furfural.

Wherein I have shown hexa or hexamethylenetetramine I wish it to include other bodies containing reactive methylene groups in condition to combine with such resinous bodies such as, for example, formaldehyde in its various forms, paraformaldehyde, trioxymethylene, anhydroformaldehydeaniline or other resinous bodies having free active methylene groups.

It is to be understood that the examples given herein are merely by way of illustration and that radical departures in procedure, proportion, reacting conditions, etc., may be made without departing from the spirit of this invention or the scope of the appended claims.

The present application discloses subject matter not claimed herein, as the claims in this case are drawn specifically to the use of various phenolic bodies combined with these natural gums. Further divisional applications will be filed to cover other disclosures not claimed herein.

I claim:

1. An abrasive composition comprising abrasive grains, a natural resin of plant origin containing free phenolic hydroxyl groups and a hardening agent.

2. An abrasive composition comprising a natural resin of plant origin containing free phenolic hydroxyl groups, another phenolic body, a hardening agent and abrasive grains.

3. An abrasive composition comprising a natural resin of plant origin containing free phenolic hydroxyl groups having another phenolic body incorporated therewith, an aldehyde and abrasive grains.

4. An abrasive composition comprising a natural resin of plant origin containing free phenolic hydroxyl groups, a synthetic resin, a hardening agent and abrasive grains.

5. An abrasive composition comprising a natural resin of plant origin containing free phenolic hydroxyl groups, a synthetic resin produced therein and abrasive grains commingled therewith.

6. An abrasive composition comprising a natural resin of plant origin containing free phenolic hydroxyl groups, a synthetic resin produced in situ therewith, a hardening agent and abrasive grains.

7. An abrasive composition comprising a natural resin of plant origin containing free phenolic hydroxyl groups and having incorporated resin forming ingredients and abrasive grains.

8. A composition for making abrasive implements comprising a natural resin of plant origin containing free phenolic hydroxyl groups, another resin incorporated therewith, a hardening agent and abrasive grains.

9. A composition for the making of abrasive implements comprising, a natural resin of plant origin containing free phenolic hydroxyl groups, an aldehyde and abrasive grains.

10. A composition for the making of abrasive implements comprising, a natural resin of plant origin containing free phenolic hydroxyl groups, a hardening agent, a solvent and abrasive grains.

11. A composition for the making of abrasive implements comprising, a natural resin of plant origin containing free phenolic hydroxyl groups, another resin incorporated therewith, a solvent and hardening agent and abrasive grains.

12. A composition for the making of abrasive implements comprising, a natural resin of plant origin containing free phenolic hydroxyl groups, a polybasic acid-polyhydric alcohol product and abrasive grains.

13. A composition for the making of abrasive implements comprising, a natural resin of plant origin containing free phenolic hydroxyl groups, a polybasic acid-polyhydric alcohol product, a solvent and hardening agent and abrasive grains.

14. The herein described method of making a composition for making abrasive implements comprising the step of commingling abrasive grains with a potentially reactive natural resin of plant origin containing free phenolic hydroxyl groups.

15. The herein described method of making a composition for making abrasive implements comprising the step of commingling abrasive gains with a solution of a natural resin of plant origin containing free phenolic hydroxyl groups.

16. The herein described method of making a composition for making abrasive implements comprising the steps of commingling abrasive grains with a solution of a natural resin of plant origin containing free phenolic hydroxyl groups and then commingling a synthetic resin therewith.

17. A formed and heat hardened abrasive implement according to claim 1 wherein gum accroides is used as the natural resin of plant origin containing free phenolic hydroxyl groups.

18. A formed and heat hardened abrasive implement according to claim 2 wherein gum accroides is used as the natural resin of plant origin containing free phenolic hydroxyl groups.

19. A formed and heat hardened abrasive implement according to claim 3 wherein gum accroides is used as the natural resin of plant origin containing free phenolic hydroxyl groups.

20. A formed and heat hardened abrasive implement according to claim 6 wherein gum accroides is used as the natural resin of plant origin containing free phenolic hydroxyl groups.

21. A formed and heat hardened abrasive implement according to claim 7 wherein gum accroides is used as the natural resin of 22. A formed and heat hardened abrasive implement according to claim 8 wherein gum accroides is used as the natural resin of plant origin containing free phenolic hydroxyl groups.

23. A formed and heat hardened abrasive implement according to claim 9 wherein gum accroides is used as the natural resin of plant origin containing free phenolic hydroxyl groups.

24. A formed and heat hardened abrasive implement according to claim 10 wherein gum accroides is used as the natural resin of plant origin containing free prenolic hydroxyl groups.

25. A formed and heat hardened abrasive implement according to claim 11 wherein gum accroides is used as the natural resin of plant origin containing free phenolic hydroxyl groups.

26. A formed and heat hardened abrasive implement according to claim 12 wherein gum accroides is used as the natural resin of plant origin containing free phenolic hydroxyl groups.

27. A formed and heat hardened abrasive implement according to claim 13 wherein gum accroides is used as the natural resin of plant origin containing free phenolic hydroxyl groups.

28. The herein described method of making a formed and heat hardened abrasive implement formed from a composition comprising a natural gum of plant origin containing free phenolic hydroxyl groups reacted in the presence of a phenolic body and an aldehyde and having incorporated therewith granular abrasive material to provide a potentially reactive moldable composition, forming said composition and heat hardening the same to a hard, set and infusible ultimate bonded body.

29. The herein described method of making a formed and heat hardened abrasive implement formed from a composition comprising a natural gum of plant origin containing free phenolic hydroxyl groups reacted in the presence of a phenolic body and an aldehyde derivative and having incorporated therewith granular abrasive material to provide a potentially reactive moldable composition, forming said composition and heat hardening the same to a hard, set and infusible body.

30. The herein described method of making an abrasive implement comprising a natural resinous product resulting from the reaction in the presence of a natural gum of plant origin containing free phenolic hydroxyl groups of a phenolic body and an aldehyde, adding said resinous product to granular abrasive material, forming an abrasive implement therefrom and heat hardening said implement to a substantially infusible and ultimate form.

31. The herein described method of making a shaped and bonded ultimate form of abrasive article consisting of the steps of incorporating a natural resin of plant origin containing free phenolic hydroxyl groups a hardening agent and a granular abrasive material, shaping said article and heating the shaped article to set and harden the bond.

32. The herein described method of making a shaped and bonded ultimate form of abrasive article consisting of the steps of incorporating a natural resin of plant origin containing free phenolic hydroxyl groups and a granular abrasive material, adding a potentially reactive synthetic resinous product, forming the composition into an abrasive article and heating said article to provide a substantially infusible, insoluble body.

33. The herein described method of making a shaped and bonded ultimate form of abrasive article consisting of the steps of incorporating a natural resin of plant origin containing free phenolic hydroxyl groups with a granular abrasive material, adding a potentially reactive phenolic resin, forming the composition into an abrasive article and heating said article to provide a substantially infusible, insoluble body.

34. The herein described method of making a shaped and bonded ultimate form of abrasive article consisting of the steps of commingling a natural resin of plant origin containing free phenolic hydroxyl groups with a potentially reactive synthetic resinous product and a hardening agent, incorporating a granular abrasive material, forming the product into an abrasive article, and heating said article to provide a substantially infusible, insoluble body.

35. The herein described method of making a shaped and bonded ultimate form of abrasive article consisting of the steps of commingling a natural resin of plant origin containing free phenolic hydroxyl groups with a potentially reactive polybasic acid-polyhydric alcohol product, incorporating a granular abrasive material, forming the product into an abrasive article, and heating said article to provide a substantially infusible, insoluble body.

36. The herein described method of making a shaped and bonded ultimate form of abrasive article consisting of the steps of incorporating gum accroides with a potentially reactive synthetic resinous product, commingling a granular abrasive material, forming the product into an abrasive article, and heating said article to provide a substantially infusible, insoluble body.

37. The herein described process which comprises dissolving a natural gum of plant origin containing free phenolic hydroxyl groups in a phenolic body, removing insoluble impurities from said solution, adding an aldehyde to the solution, heating to cause a reaction between said materials resulting in the formation of a new resinous product and incorporating a granular abrasive material with said resinous product and hardening the resinous product by further heating to cause it to become substantially infusible and act as a binder for said abrasive material to produce an abrasive implement.

38. The herein described process which comprises eliminating substantially all of the objectionable insoluble impurities from a natural resin of plant origin containing free phenolic hydroxyl groups, adding a potentially reactive synthetic resinous product and a hardening agent, incorporating a granular abrasive material with said materials, and hardening the resultant product by the action of heat to form an abrasive implement.

39. The herein described process which comprises dissolving a natural gum of plant origin containing free phenolic hydroxyl groups in a phenolic body, removing objectionable insoluble impurities from said solution, adding a hardening agent to said solution and heating to cause said ingredients to react to form a fusible but potentially reactive resinous product, incorporating a granular abrasive material with said resinous product, pressing said materials to a predetermined shape and size and heating to harden the resin and form a relatively strong abrasive implement.

40. The herein described process which comprises dissolving a natural gum of plant origin containing free phenolic hydroxyl groups in a phenolic body and an aldehyde, removing objectionable insoluble impurities from said solution, heating to cause said ingredients to react to form a fusible but potentially reactive resinous product, incorporating a granular abrasive material with said resinous product, pressing said materials to a predetermined shape and size and heating to harden the resin and form a relatively strong abrasive implement.

41. The herein described process comprising eliminating substantially all of the objectionable insoluble impurities from a natural gum of plant origin containing free phenolic hydroxyl groups while said gum is in solution, incorporating with said natural gum a potentially reactive synthetic resinous product, incorporating an abrasive granular material therewith, pressing the composite mass to a predetermined shape and size and heating to harden the resin and form a. relatively strong abrasive implement.

42. An abrasive implement comprising a granular abrasive material and a binder consisting of a natural gum of plant origin containing free phenolic hydroxyl groups and a potentially reactive synthetic resin said binder being hardened to a hard set infusible state.

43. An abrasive implement comprising a granular abrasive material and a binder consisting of a natural gum of plant origin containing free phenolic hydroxyl groups and a potentially reactive phenol-aldehyde resinous condensation product, said binder being hardened to a hard set infusible state.

44. An abrasive implement comprising a granular abrasive material and a binder consisting of a natural gum of plant origin containing free phenolic hydroxyl groups and a potentially reactive polybasic acid-polyhydric alcohol condensation product, said binder being hardened to a hard set infusible state.

45. An abrasive implement comprising a granular abrasive material and a binder consisting of gum accroides, a phenolic body and an aldehyde reacted to a hard set infusible state.

Signed at Philadelphia, in the county of Philadelpiha and State of Pennsylvania, this twenty-third day of November A. D. 1932.

EMIL E. NOVOTNY.